(12) United States Patent
Garces et al.

(10) Patent No.: US 11,445,732 B2
(45) Date of Patent: Sep. 20, 2022

(54) SYSTEM AND METHOD FOR IDENTIFYING AN EMISSIONS CONTROL FAILURE IN AN INDOOR SMOKER

(71) Applicant: Haier US Appliance Solutions, Inc., Wilmington, DE (US)

(72) Inventors: Tomas Garces, Louisville, KY (US); Daniel Carballo, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 649 days.

(21) Appl. No.: 16/532,632

(22) Filed: Aug. 6, 2019

(65) Prior Publication Data
US 2021/0037839 A1    Feb. 11, 2021

(51) Int. Cl.
*A23B 4/052*     (2006.01)
*B01D 53/86*     (2006.01)
*B01D 53/88*     (2006.01)

(52) U.S. Cl.
CPC ........ *A23B 4/0523* (2013.01); *B01D 53/8687* (2013.01); *B01D 53/8696* (2013.01); *B01D 53/885* (2013.01); *A23V 2002/00* (2013.01); *B01D 2257/708* (2013.01); *B01D 2258/0275* (2013.01)

(58) Field of Classification Search
CPC ....... A23B 4/0523; A23B 5/052; A23B 4/052; A23V 2002/00; Y02A 40/90; B01D 2257/502; B01D 53/885; B01D 2255/1021; B01D 2258/0275; B01D 53/8643; B01D 53/8696; B01D 2257/404; B01D 2258/06; B01D 2255/1025; B01D 53/8687; B01D 2257/708; B01D 2255/1023; B01D 2257/702
See application file for complete search history.

(56) References Cited

U.S. PATENT DOCUMENTS

| | | | |
|---|---|---|---|
| 5,622,100 A | 4/1997 | King et al. | |
| 9,513,005 B2 | 12/2016 | Schneider et al. | |
| 9,683,747 B2 | 6/2017 | Raghavan et al. | |
| 2019/0335772 A1* | 11/2019 | Garces | B01D 53/8628 |
| 2020/0054032 A1* | 2/2020 | Garces | A23B 4/0523 |

FOREIGN PATENT DOCUMENTS

| | | | | |
|---|---|---|---|---|
| CN | 105 477 953 A | * | 4/2016 | ............ B01D 46/30 |
| JP | 03587177 B2 | | 11/2004 | |

* cited by examiner

*Primary Examiner* — Timothy C Vanoy
(74) *Attorney, Agent, or Firm* — Dority & Manning, P.A.

(57) ABSTRACT

An indoor smoker includes a smoking chamber and an air handler for drawing a flow of smoke from the smoking chamber through an exhaust duct. A catalytic converter is positioned in the exhaust duct and includes a catalytic element and catalytic heater for heating the catalytic element to a temperature suitable for regulating emissions from the flow of smoke. A temperature sensor is used to monitor the temperature of the catalytic element, and smoke generation is stopped when the catalyst temperature drops below a temperature threshold or drops at a rate that exceeds a threshold rate, which may be indicative of a failure of the catalyst heater or air handler.

20 Claims, 5 Drawing Sheets

SYSTEM AND METHOD FOR IDENTIFYING AN EMISSIONS CONTROL FAILURE IN AN INDOOR SMOKER

FIELD OF THE INVENTION

The present subject matter relates generally to indoor smokers, and more particularly to systems and methods of smoke and emissions regulation in indoor smokers.

BACKGROUND OF THE INVENTION

Conventional smokers include a smoking chamber and a firebox positioned within or fluidly coupled to the smoking chamber. The firebox is filled with a combustible material, such as wood or wood byproducts that are ignited or otherwise heated to generate smoke and/or heat. The heat and smoke are routed into the smoking chamber to impart flavor on and cook food items positioned within the smoking chamber. One or more heating elements may be positioned within the smoking chamber and the firebox to maintain the temperatures necessary both for cooking the food and for generating the desired amount of smoke.

Conventional smokers are used outdoors and simply exhaust smoke directly outside through a chimney or vent. Notably, such smoke frequently contains harmful byproducts of the combusted fuel, such as volatile organic compounds (VOCs) or other harmful emissions. These byproducts, as well as the large amount of smoke generated by the combusted fuel, generally prohibit the use of smokers inside the home. Although fume hoods or exhaust systems may be used to route the smoke from indoors to outdoors, such systems would be complex, costly, and frequently not practical or effective.

Catalysts may be used to help regulate or reduce harmful emissions from smoke generated in indoor smokers, but such catalysts typically require that the catalyst material be heated to a suitably high temperature in order to effectively eliminate byproducts of the smoldering process such as carbon monoxide. In the event of a failure of one or more system components, the temperature of the catalyst may drop below a suitable threshold temperature, at which point unregulated and harmful emissions may enter freely into the room where the indoor smoker is located.

Accordingly, a smoker that has features for permitting safe indoor use would be useful. More specifically, an indoor smoker with a catalytic converter system that includes failure detection features would be particularly beneficial.

BRIEF DESCRIPTION OF THE INVENTION

Aspects and advantages of the invention will be set forth in part in the following description, may be apparent from the description, or may be learned through practice of the invention.

In one aspect of the present disclosure, an indoor smoker is provided including a cabinet defining a discharge vent, a smoking chamber positioned within the cabinet and defining a chamber outlet, and an exhaust duct extending between the chamber outlet and the discharge vent. An air handler is fluidly coupled with the exhaust duct for urging a flow of smoke from the smoking chamber, through the exhaust duct, and out of the discharge vent, and a catalytic converter is positioned within the exhaust duct, the catalytic converter including a catalytic element and a catalyst heater. A temperature sensor detects a catalyst temperature of the catalytic element and a controller is in operative communication with the temperature sensor for measuring the catalyst temperature using the temperature sensor, determining that an emissions control failure has occurred based at least in part on the catalyst temperature, and stopping the flow of smoke in response to determining that the emissions control failure has occurred.

In another aspect of the present disclosure, a method of operating an indoor smoker is provided. The indoor smoker includes an exhaust duct for extracting a flow of smoke from a smoking chamber, a catalytic element positioned within the exhaust duct for lowering volatile organic compounds within the flow of smoke, and a temperature sensor for measuring a catalyst temperature of the catalytic element. The method includes measuring the catalyst temperature using the temperature sensor, determining that an emissions control failure has occurred based at least in part on the catalyst temperature, and stopping the flow of smoke in response to determining that the emissions control failure has occurred.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
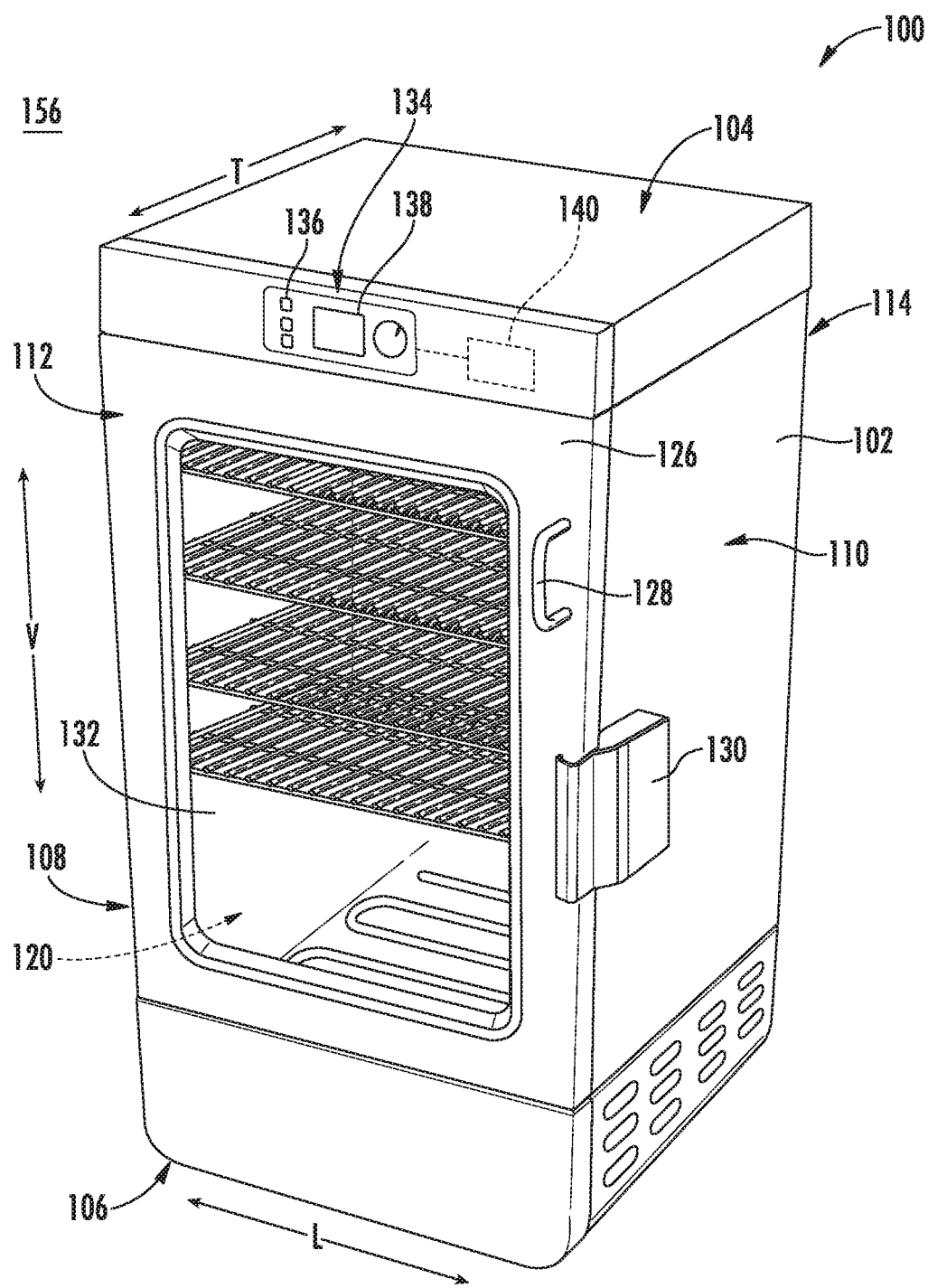
FIG. 1 provides a perspective view of an indoor smoker with a door in a closed position in accordance with an example embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. In addition, as used herein, terms of approximation, such as "approximately," "substantially," or "about," refer to being within a ten percent margin of error. Furthermore, the term "smoke" is generally used to refer to the flow of air, smoke, combustion byproducts, or any combination thereof through an appliance.

Figure 2:
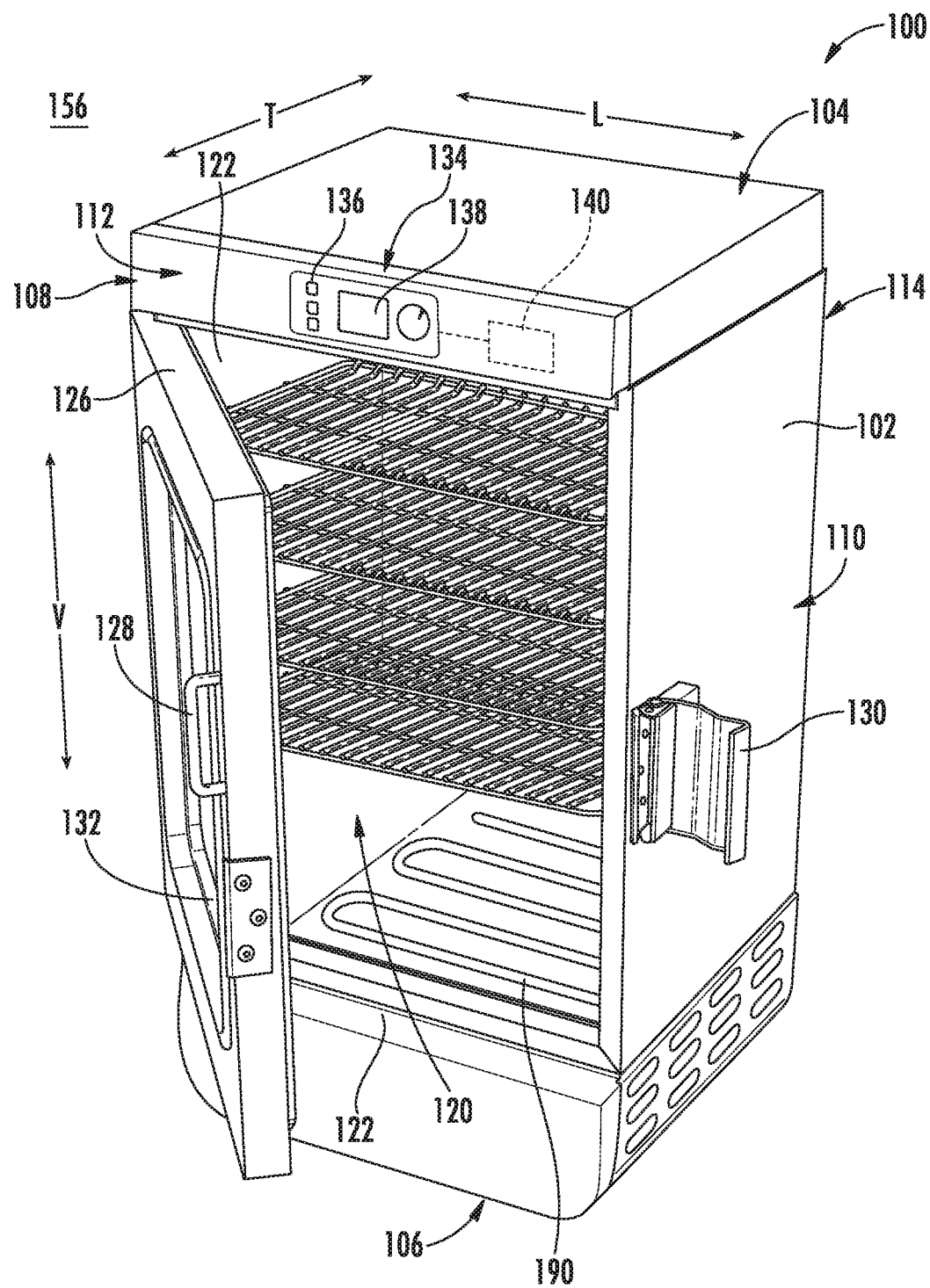
FIG. 2 provides a perspective view the exemplary indoor smoker of FIG. 1 with the door opened.

FIGS. 1 and 2 provide perspective views of an indoor smoker 100 according to an exemplary embodiment of the present subject matter with the door in the closed position and the open position, respectively. Indoor smoker 100 generally defines a vertical direction V, a lateral direction L, and a transverse direction T, each of which is mutually perpendicular, such that an orthogonal coordinate system is generally defined. As illustrated, indoor smoker 100 includes an insulated cabinet 102. Cabinet 102 of indoor smoker 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a smoking chamber 120 which is configured for the receipt of one or more food items to be cooked and/or smoked. In general, smoking chamber 120 is at least partially defined by a plurality of chamber walls 122. Specifically, smoking chamber 120 may be defined by a top wall, a rear wall, a bottom wall, and two sidewalls. These chamber walls 122 may define smoking chamber 120 and an opening through which a user may access food articles placed therein. In addition, chamber walls 122 may be joined, sealed, and insulated to help retain smoke and heat within smoking chamber 120. In this regard, for example, in order to insulate smoking chamber 120, indoor smoker 100 includes an insulating gap defined between chamber walls 122 and cabinet 102. According to an exemplary embodiment, the insulation gap is filled with insulating material (not shown), such as insulating foam or fiberglass.

Indoor smoker 100 includes a door 126 rotatably attached to cabinet 102 in order to permit selective access to smoking chamber 120. A handle 128 is mounted to door 126 to assist a user with opening and closing door 126 and a latch 130 is mounted to cabinet 102 for locking door 126 in the closed position during a cooking or smoking operation. In addition, door 126 may include one or more transparent viewing windows 132 to provide for viewing the contents of smoking chamber 120 when door 126 is closed and also to assist with insulating smoking chamber 120.

Referring still to FIGS. 1 and 2, a user interface panel 134 and a user input device 136 may be positioned on an exterior of cabinet 102. User interface panel 134 may represent a general purpose Input/Output ("GPIO") device or functional block. In some embodiments, user interface panel 134 may include or be in operative communication with user input device 136, such as one or more of a variety of digital, analog, electrical, mechanical or electro-mechanical input devices including rotary dials, control knobs, push buttons, and touch pads. User input device 136 is generally positioned proximate to user interface panel 134, and in some embodiments, user input device 136 may be positioned on user interface panel 134. User interface panel 134 may include a display component 138, such as a digital or analog display device designed to provide operational feedback to a user.

Generally, indoor smoker 100 may include a controller 140 in operative communication with user input device 136. User interface panel 134 of indoor smoker 100 may be in communication with controller 140 via, for example, one or more signal lines or shared communication busses, and signals generated in controller 140 operate indoor smoker 100 in response to user input via user input devices 136. Input/Output ("I/O") signals may be routed between controller 140 and various operational components of indoor smoker 100 such that operation of indoor smoker 100 can be regulated by controller 140.

Controller 140 is a "processing device" or "controller" and may be embodied as described herein. Controller 140 may include a memory and one or more microprocessors, microcontrollers, application-specific integrated circuits (ASICS), CPUs or the like, such as general or special purpose microprocessors operable to execute programming instructions or micro-control code associated with operation of indoor smoker 100, and controller 140 is not restricted necessarily to a single element.

The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 140 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Although aspects of the present subject matter are described herein in the context of an indoor smoker having a single smoking chamber, it should be appreciated that indoor smoker 100 is provided by way of example only. Other smoking appliances having different configurations, different appearances, and/or different features may also be utilized with the present subject matter, e.g., outdoor smokers, conventional oven appliances, or other suitable cooking appliances. Thus, the example embodiment shown in FIG. 1 is not intended to limit the present subject matter to any particular smoking configuration or arrangement. Moreover, aspects of the present subject matter may be used in any other consumer or commercial appliance where it is desirable to regulate a flow of smoke or harmful emissions in an appliance.

Figure 3:
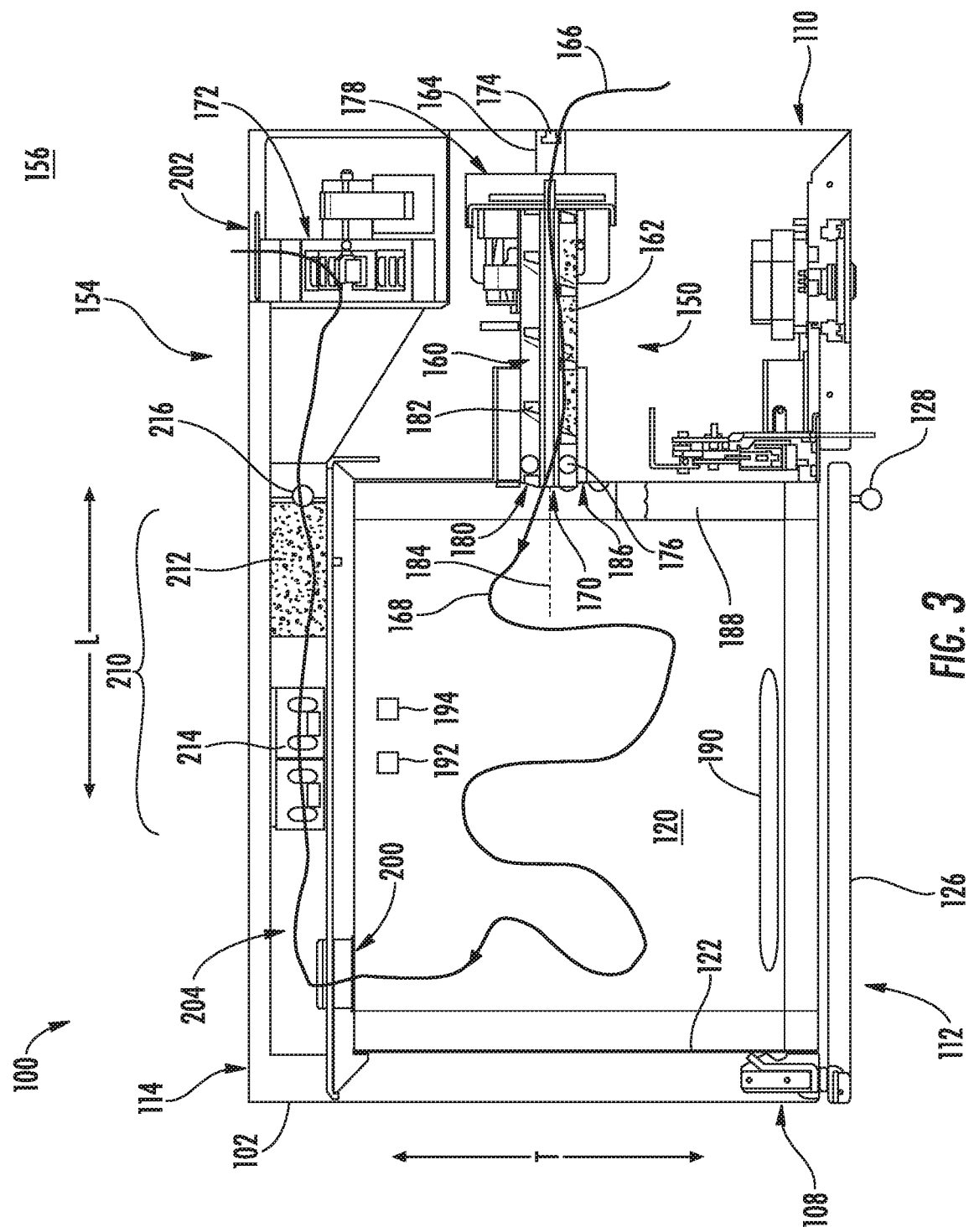
FIG. 3 provides a schematic, top cross-sectional view of the exemplary indoor smoker of FIG. 1 according to an exemplary embodiment of the present subject matter.

Referring now also to FIG. 3, various internal components of indoor smoker 100 and their respective functions will be described according to an exemplary embodiment of the present subject matter. In this regard, FIG. 3 illustrates a schematic top cross-sectional view of indoor smoker 100 of FIG. 1. As shown, indoor smoker 100 generally includes smoking chamber 120 for receiving items to be cooked/smoked, a smoke generating device or smoke generator 150 for generating smoke, and an exhaust system 154 for safely discharging that the air and/or smoke into an indoor environment 156 (i.e., outside of indoor smoker 100). Each of these systems and components will be described in detail below.

Referring still to FIG. 3, smoke generator 150 generally defines a smoldering chamber 160 which is configured for receiving combustible material 162. As used herein, "combustible material" is generally used to refer to any suitable material positioned within smoldering chamber 160 for generating smoke. Specifically, according to exemplary embodiments, combustible material 162 includes wood or wood byproducts, such as wood chunks, wood chips, wood pellets, or wood resin. According to the exemplary embodiment, smoke generator 150 may include a door or another access panel (not shown) for providing selective access to smoldering chamber 160, e.g., to add additional combustible material 162.

As best illustrated in FIG. 3, smoke generator 150 defines an air inlet 164 for receiving air to support the combustion or smoldering process. Specifically, air inlet 164 is configured for receiving a flow of combustion air (indicated by reference numeral 166 in FIG. 3) from the ambient environment 156 surrounding indoor smoker 100 or from another air supply source. During a smoking process, combustible material 162 is ignited and the flow of combustion air 166 supports the smoldering process to generate a flow of smoke (indicated by reference numeral 168 in FIG. 3). Smoke generator 150 further defines a smoke outlet 170 for providing a flow of smoke 168 into smoking chamber 120 during a smoking operation, as will be described in detail below.

Indoor smoker 100 further includes an air handler 172 for urging the flow of combustion air 166 into smoldering chamber 160 through air inlet 164 for facilitating the smoldering process and smoke generating process. In addition, indoor smoker 100 may further include features for preventing or regulating the flow of combustion air 166 from entering indoor smoker 100 from environment 156 when the flow of such air is not desired. In this regard, for example, indoor smoker 100 may include an inlet check valve 174 which is operably coupled to air inlet 164. In general, this check valve prevents the flow of combustion air 166 from entering smoldering chamber 160 when not desired.

For example, inlet check valve 174 may have a "cracking pressure," which is used herein to refer to the pressure, or more precisely the negative pressure, required within smoldering chamber 160 to open inlet check valve 174. In this manner, inlet check valve 174 may be designed to permit the flow of combustion air 166 only when air handler 172 is operating and urging air through smoldering chamber 160, thus facilitating the quick and effective asphyxiation of combustible material 162 within smoldering chamber 160 when desired.

Referring still to FIG. 3, smoke generator 150 includes one or more smoldering heaters 176 which are positioned in smoldering chamber 160 or otherwise placed in thermal communication with combustible material 162 stored in smoldering chamber 160 for smoldering combustible material 162. According to an exemplary embodiment, smoldering heater 176 may include one or more cartridge heaters or silicon nitride igniters. Alternatively, smoldering heater 176 may include any other suitable type, position, and configuration of heating elements. As used herein, the term "heating element," "heaters," and the like may generally refer to electric resistance heating elements, gas burners, microwave heating elements, halogen heating elements, or suitable combinations thereof.

As used herein, the verb "smolder" or variations thereof is intended to refer to burning a combustible material (e.g., combustible material 162) slowly such that smoke is generated but little or no flame is generated. In this manner, the combustible material is not expended quickly, but a large amount of smoke is generated for the smoking process. Notably, the burn rate of combustible material and the amount of smoke generated is regulated using smoldering heater 176 positioned within smoldering chamber 160. For typical combustible material used in smokers, e.g., wood and wood byproducts, a typical smoldering temperature is between about 650° F. and 750° F. However, the exact temperature may vary depending on the combustible material used, the air flow rate through smoldering chamber 160, the level of combustible material 162, and other factors.

According to the illustrated embodiment, smoke generator 150 extends between a first end 178 proximate to air inlet 164 and a second and 180 positioned proximate smoke outlet 170. As shown, smoldering heater 176 is positioned proximate second end 180, e.g., immediately adjacent smoke outlet 170. Smoke generator 150 further includes a rotating auger 182 that is mounted within smoldering chamber 160 and generally rotates about a central axis 184. In this manner, as rotating auger 182 rotates, combustible material 162 positioned within smoldering chamber 160 is slowly but progressively advanced past smoldering heater 176.

After combustible material 162 positioned near smoldering heater 176 is completely consumed or smoldered, rotating auger 182 may rotate to advance the consumed material toward a discharge port 186 positioned at second end 180 of smoke generator 150. According to an exemplary embodiment, a container of water 188 may be positioned below discharge port 186 such that used combustible material 162 may fall therein and immediately extinguish. According to alternative embodiments, consumed combustible material 162 may be discharged in any other suitable manner into to any other suitable container or reservoir.

In order to ensure a desirable cooking temperature within smoking chamber 120, indoor smoker 100 further includes a chamber heater 190 that is positioned within or otherwise in thermal communication with smoking chamber 120 for regulating the temperature in smoking chamber 120. In general, chamber heater 190 may include one or more heating elements positioned within cabinet 102 for selectively heating smoking chamber 120. For example, the heating elements may be electric resistance heating elements, gas burners, microwave heating elements, halogen heating elements, or suitable combinations thereof. Notably, because chamber heater 190 is operated independently of smoke generator 150 (e.g., as described below), smoking chamber 120 may be maintained at any suitable temperature during a smoking process. More specifically, for example, chamber heater 190 may be turned off or on a very low setting for smoking cheeses or may be turned on high for quickly cooking and smoking meats.

In some embodiments, indoor smoker 100 also includes one or more sensors that may be used to facilitate improved operation of the appliance, such as described below. For example, indoor smoker 100 may include one or more temperature sensors and/or humidity sensors which are generally operable to measure the internal temperature and humidity in indoor smoker 100, e.g., within smoking chamber 120 and/or smoldering chamber 160. More specifically, as illustrated, indoor smoker 100 includes a temperature sensor 192 and a humidity sensor 194 positioned within smoking chamber 120 and being operably coupled to controller 140. In some embodiments, controller 140 is configured to vary operation of chamber heater 190 based on one or more temperatures detected by temperature sensor 192 or humidity measurements from humidity sensor 194.

As described herein, "temperature sensor" may refer to any suitable type of temperature sensor. For example, the temperature sensors may be thermocouples, thermistors, or resistance temperature detectors. Similarly, "humidity sensor" may refer to any suitable type of humidity sensor, such as capacitive digital sensors, resistive sensors, and thermal conductivity humidity sensors. In addition, temperature sensor 192 and humidity sensor 194 may be mounted at any suitable location and in any suitable manner for obtaining a desired temperature or humidity measurement, either directly or indirectly. Although exemplary positioning of certain sensors is described below, it should be appreciated that indoor smoker 100 may include any other suitable number, type, and position of temperature and/or humidity sensors according to alternative embodiments.

As mentioned briefly above, indoor smoker 100 further includes an exhaust system 154 which is generally configured for safely discharging the flow of smoke 168 from indoor smoker 100. Specifically, according to the illustrated embodiment, exhaust system 154 generally extends between a chamber outlet 200 and a discharge vent 202 defined by cabinet 102 for directing the flow of smoke 168 from smoking chamber 120 to the environment 156. Although an exemplary exhaust system 154 is described below, it should be appreciated that variations and modifications may be made while remaining within the scope of the present subject matter. For example, the routing of ducts, the catalytic converter arrangement, and the types of sensors used may vary according to alternative embodiments.

As shown, exhaust system 154 includes an exhaust duct 204 that generally extends between and provides fluid communication between chamber outlet 200 and discharge vent 202. Air handler 172 is operably coupled with exhaust duct 204 for urging the flow of smoke 168 through exhaust duct 204 and out of discharge vent 202 to environment 156. According to the illustrated exemplary embodiment, air handler 172 is a centrifugal fan positioned within exhaust duct 204. However, it should be appreciated that according to alternative embodiments, air handler 172 may be positioned at any other suitable location and may be any other suitable fan type, such as a tangential fan, an axial fan, etc.

In addition, according to an exemplary embodiment, air handler 172 is a variable speed fan such that it may rotate at different rotational speeds, thereby generating different air flow rates. In this manner, the amount of smoke drawn from smoldering chamber 160 may be continuously and precisely regulated. Moreover, by pulsing the operation of air handler 172 or throttling air handler 172 between different rotational speeds, the flow of smoke 168 drawn into smoking chamber 120 may enter from a different direction, may have a different flow velocity, or may generate a different flow pattern within smoking chamber 120. Thus, by pulsating the variable speed fan or otherwise varying its speed, the flow of smoke 168 may be randomized, thereby eliminating stagnant regions within smoking chamber 120 and better circulating the flow of smoke 168 to provide a more even cooking/smoking profile.

As illustrated, indoor smoker 100 further includes a catalytic converter 210 which is positioned within exhaust duct 204 for lowering or removing volatile organic compounds (VOCs) from the flow of smoke 168. As used herein, "catalytic converter" or variations thereof may be used to refer to any component, machine, or device that is configured for removing or lowering volatile organic compounds (VOCs), toxic gases, harmful emissions, pollutants, or undesirable compounds from a flow of air and smoke. For example, according to the illustrated embodiment, catalytic converter 210 generally includes a catalytic element 212 and a catalyst heater 214.

In general, catalytic element 212 includes a material that causes an oxidation and a reduction reaction. For example, precious metals such as platinum, palladium, and rhodium are commonly used as catalyst materials, though other catalysts are possible and within the scope of the present subject matter. In operation, the catalytic element 212 may combine oxygen ($O_2$) with carbon monoxide (CO) and unburned hydrocarbons to produce carbon dioxide ($CO_2$) and water ($H_2O$). In addition, according to exemplary embodiments, catalytic element 212 may remove nitric oxide (NO) and nitrogen dioxide ($NO_2$).

Notably, catalytic converters typically require that the catalyst be heated to a suitably high temperature in order to catalyze the necessary chemical reactions. Therefore, catalyst heater 214 is in thermal communication with catalytic element 212 for heating it to a suitable temperature, such as approximately 800° F. According to the illustrated embodiment, catalyst heater 214 is positioned upstream of catalytic element 212 to provide thermal energy through convection. However, it should be appreciated that according to alternative embodiments, catalyst heater 214 may be in direct contact with catalytic element 212 to provide thermal energy through conduction, or may be thermally coupled to catalytic element 212 in any other suitable manner.

Figure 4:
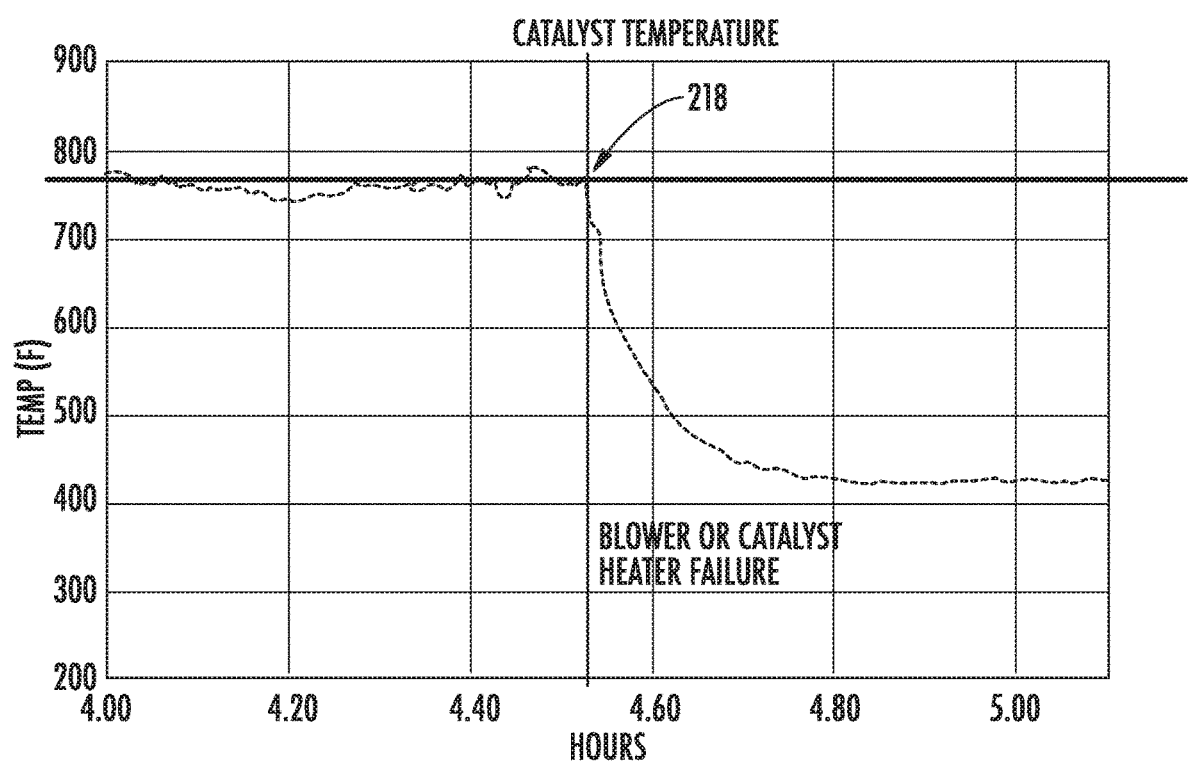
FIG. 4 is a plot of a catalyst temperature in the event of a blower or catalyst heater failure according to an exemplary embodiment of the present subject matter.

In order to ensure a catalyst temperature of catalytic element 212 remains above a temperature suitable for controlling emissions, indoor smoker 100 may further include a catalyst temperature sensor 216 that is in thermal communication with catalytic element 212 for monitoring the catalyst temperature. For example, an exemplary temperature profile of catalytic element 212 is illustrated in FIG. 4. As will be described below, controller 140 may be in operative communication with temperature sensor 216 and may provide corrective action or a user notification in the event that the catalyst temperature falls outside of the desired range, e.g., indicating an emissions control failure identified in FIG. 4 by reference numeral 218.

Notably, temperature sensor 216 may generally be positioned at any suitable location for determining an effective temperature of catalytic element 212. In this regard, the measured catalyst temperature is preferably a catalyst temperature that corresponds with or is indicative of the amount of VOCs or emissions that may be removed from a flow of smoke. According to the illustrated embodiment, temperature sensor 216 is positioned at a downstream end of catalytic element 212, e.g., between catalytic element 212 and air handler 172. In addition, catalyst heater 214 is positioned upstream of catalytic element 212, e.g., to heat the flow of smoke 168 prior to entering catalytic element 212 in order to raise the temperature of catalytic element 212. It should be appreciated that other temperature sensor positions and catalytic converter configurations may be used while remaining within the scope of the present subject matter.

Thus, during operation of indoor smoker 100, air handler 172 draws the flow of combustion air 166 into smoldering chamber 160 through air inlet 164. The flow of combustion air 166 and combustible material 162 in the smoldering chamber 160 generate the flow of smoke 168 which is drawn into smoking chamber 120 as described below. The flow of smoke 168 passes through smoking chamber 120 for performing a smoking process on food items positioned therein before exiting smoking chamber 120 through chamber outlet 200. Air handler 172 then continues to urge the flow of smoke 168 through catalytic converter 210 and exhaust duct 204 before passing out discharge vent 202.

Now that the construction and configuration of indoor smoker 100 has been described according to an exemplary embodiment of the present subject matter, an exemplary method 300 for regulating a flow of air and/or smoke within or otherwise operating an indoor smoker will be described according to an exemplary embodiment of the present subject matter. Method 300 can be implemented by controller 140 and may be used to operate indoor smoker 100, or any other smoker or cooking appliance. It should be appreciated that the exemplary method 300 is discussed herein only to describe exemplary aspects of the present subject matter, and is not intended to be limiting.

Figure 5:
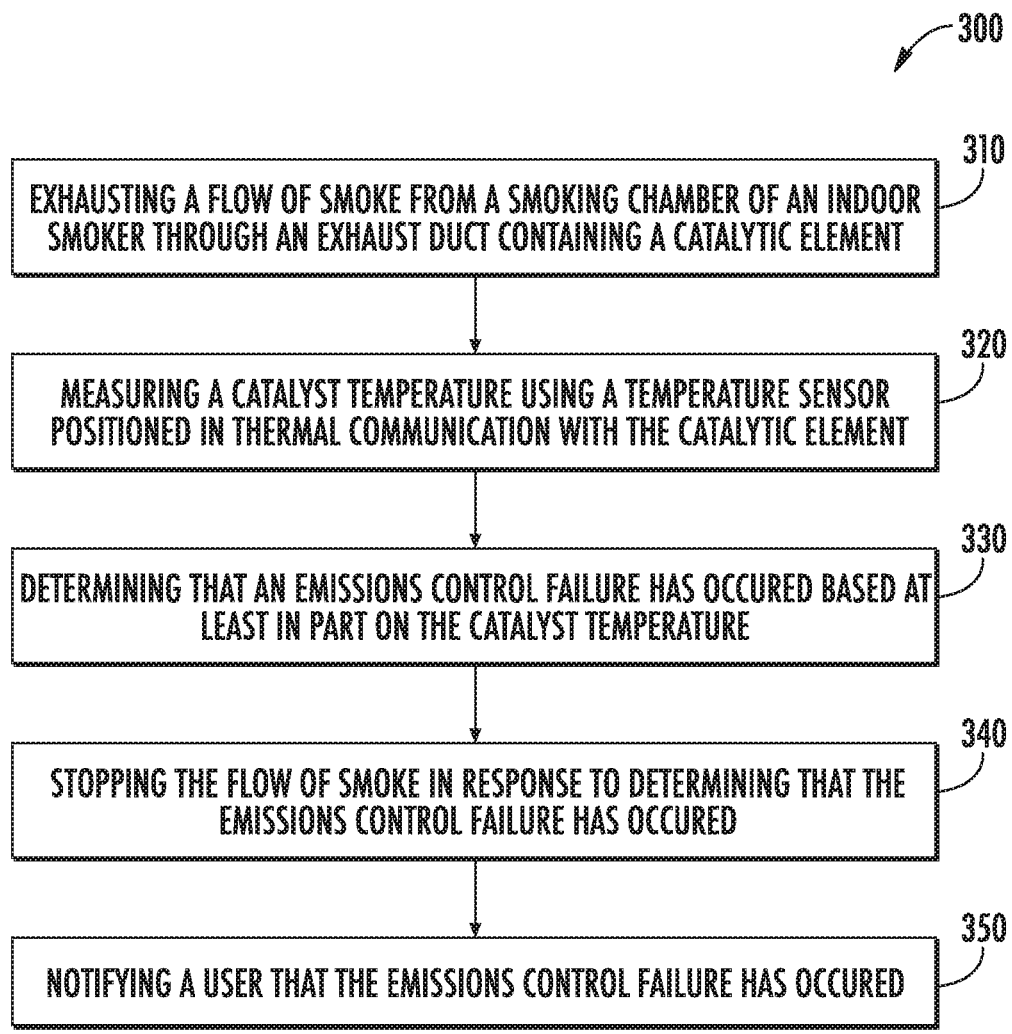
FIG. 5 is a method of operating an indoor smoker according to an example embodiment of the present subject matter.

Referring now to FIG. 5, method 300 includes, at step 310, exhausting a flow of smoke from a smoking chamber of an indoor smoker through an exhaust duct containing a catalytic element. In this regard, according to the embodiment described above, the flow of smoke 168 within smoking chamber 120 of indoor smoker 100 may be withdrawn or evacuated through exhaust duct 202 using air handler 172. Notably, as explained above, catalyst heater 214 is generally configured for heating the flow of smoke 168 to maintain catalytic element 212 at a temperature suitable for reducing emissions within the flow of smoke 168.

Notably, in the event of a failure of one or more system components, particularly those components related to exhaust system 154, the temperature of catalytic element 212 may not be suitable for removing harmful emissions or contaminants from the flow of smoke 168. When such a failure occurs, the flow of smoke 168 may pass through catalytic converter 210 and out discharge vent 202 without having harmful VOCs or emissions removed. For example, if catalyst heater 214 fails for any reason, air handler 172 may continue to draw the flow of smoke 168 from smoking chamber 120 through catalytic converter 210, but the catalytic converter 210 will no longer be heated such that harmful emissions remain within, and are exhausted with, the flow of smoke 168. By contrast, if air handler 172 fails, catalyst heater 214 will only keep an upstream end of catalytic element 212 heated, while downstream end of catalytic element 212 remains relatively cool, e.g., because the flow of heated smoke is not drawn through catalytic element 212. In either instance, it may be desirable to stop the production of the flow of smoke 168 or to otherwise isolate smoking chamber 120 to prevent harmful VOCs from escaping into environment 156.

Thus, step 320 includes measuring a catalyst temperature using a temperature sensor positioned in thermal communication with the catalytic element. For example, FIG. 4 provides a plot of catalyst temperature measurements throughout a smoking process according to an exemplary embodiment. By monitoring this catalyst temperature, controller 140 may make determinations as to the operation and performance of indoor smoker 100, and can take corrective action in the event of dangerous or undesirable conditions.

For example, step 330 includes determining that an emissions control failure has occurred based at least in part on the catalyst temperature. As used herein, "emissions control failure" is intended to refer to any condition or situation where a flow of smoke is being generated by an indoor smoker while an emissions control system (e.g., such as catalytic converter 210) is not operating as required to remove harmful emissions or contaminants from that flow of smoke. For example, according to exemplary embodiments, an emissions control failure with respect to indoor smoker 100 may include the failure of air handler 172 and/or catalyst heater 214.

According to exemplary embodiments, the occurrence of an emissions control failure may be determined based on an absolute temperature of catalytic element 212. In this regard, for example, if the catalyst temperature drops below a predetermined temperature threshold, an emissions control failure may be triggered and corrective action may be taken. According to an exemplary embodiment, the predetermined temperature threshold may be between about 500° F. and 800° F., between about 600° F. and 700° F., or approximately 650° F. It should be appreciated that the predetermined temperature may vary based on a variety of factors, including catalyst material, smoke flow rates, etc.

According to another exemplary embodiment, the occurrence of an emissions control failure may be determined based on a rate of change of the catalyst temperature. For example, if the rate of change of the catalyst temperature drops faster than a predetermined threshold rate, an emissions control failure may be triggered. According to an exemplary embodiment, the threshold rate may be between about 25° F. and 200° F. per minute, between about 75° F. and 125° F. per minute, or approximately 100° F. per minute. Other threshold rates are possible and remain within the scope of the present subject matter Step 340 includes stopping the flow of smoke in response to determining that an emissions control failure has occurred. For example, if controller 140 detects that catalyst temperature has dropped below the temperature threshold (e.g., 650° F.), or if the catalyst temperature is dropping at a rate that exceeds a threshold rate (e.g., 100° F./minute), controller 140 may determine that it is not safe to generate additional smoke and may shut down indoor smoker 100 to prevent the flow of smoke 168.

In general, indoor smoker 100 may be configured for stopping the flow of smoke in accordance with step 340 in any suitable manner. For example, smoke generator 150 may be sealed off or extinguished to prevent smoke generation. According to an exemplary embodiment, rotating auger 182 may rotate to advance combustible material 162 out of smoldering chamber 160 and into the container of water 188. In this manner, the water may immediately extinguish combustible material to prevent further smoke generation. In addition, smoldering heater 176 and/or chamber heater 190 may be turned off. According still other embodiments, indoor smoker 100 may include one or more dampers (not shown) that are configured to seal off smoking chamber 120 or smoldering chamber 160 in the event of an emissions control failure.

In addition, step 350 may include notifying a user that the emissions control failure has occurred. In this manner, a user may be informed of such a failure so that corrective action may be implemented. According to an exemplary embodiment, the user notification may be provided via display 138 or in any other suitable manner. In this regard, controller 140 may trigger a particular message on display 138 or may illuminate an indicator light to inform a user that service is needed. According to still other embodiments, controller 140 may communicate with a remote server, an external network, and/or a remote device such as a mobile phone to provide such indication.

FIG. 5 depicts an exemplary method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using indoor smoker 100 as an example, it should be appreciated that these methods may be applied to regulate smoke in any other smoking appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An indoor smoker comprising:
  a cabinet defining a discharge vent;
  a smoking chamber positioned within the cabinet and defining a chamber outlet;
  an exhaust duct extending between the chamber outlet and the discharge vent;
  an air handler fluidly coupled with the exhaust duct for urging a flow of smoke from the smoking chamber, through the exhaust duct, and out of the discharge vent;
  a catalytic converter positioned within the exhaust duct, the catalytic converter comprising a catalytic element and a catalyst heater;
  a temperature sensor for detecting a catalyst temperature of the catalytic element; and
  a controller in operative communication with the temperature sensor, the controller being configured for:
    measuring the catalyst temperature using the temperature sensor;
    determining that an emissions control failure has occurred based at least in part on the catalyst temperature; and
    stopping the flow of smoke in response to determining that the emissions control failure has occurred.

2. The indoor smoker of claim 1, wherein the emissions control failure occurs when the catalyst temperature drops below a temperature threshold.

3. The indoor smoker of claim 2, wherein the temperature threshold is 700 degrees Fahrenheit.

4. The indoor smoker of claim 1, wherein the emissions control failure occurs when the air handler or the catalyst heater stops working properly.

5. The indoor smoker of claim 1, wherein the emissions control failure occurs when a rate of change of the catalyst temperature drops faster than a threshold rate.

6. The indoor smoker of claim 5, wherein the threshold rate is 100 degrees Fahrenheit per minute.

7. The indoor smoker of claim 1, further comprising:
  a smoke generator for generating the flow of smoke, wherein stopping the flow of smoke comprises disabling the smoke generator.

8. The indoor smoker of claim 7, wherein the smoke generator comprises an auger that urges a combustible material past a smoldering heater to generate the flow of smoke, and wherein stopping the flow of smoke comprises advancing the auger of the smoke generator to push the combustible material away from the smoldering heater.

9. The indoor smoker of claim 7, wherein stopping the flow of smoke comprises extinguishing the combustible material in a container of water.

10. The indoor smoker of claim 7, wherein the combustible material comprises wood chips, wood pellets, or wood resin.

11. The indoor smoker of claim 1, further comprising:
  a chamber heater in thermal communication with the smoking chamber for regulating a chamber temperature, wherein stopping the flow of smoke comprises turning off the chamber heater.

12. The indoor smoker of claim 1, wherein the controller is further configured for:
  notifying a user that the emissions control failure has occurred.

13. The indoor smoker of claim 1, wherein the temperature sensor is positioned downstream of the catalytic element.

14. The indoor smoker of claim 1, wherein the temperature sensor is positioned between the catalytic element and the air handler.

15. The indoor smoker of claim 1, wherein the catalyst heater is positioned upstream of the catalytic element.

16. A method of operating an indoor smoker, the indoor smoker comprising an exhaust duct for extracting a flow of smoke from a smoking chamber, a catalytic element positioned within the exhaust duct for lowering volatile organic compounds within the flow of smoke, and a temperature sensor for measuring a catalyst temperature of the catalytic element, the method comprising:
  measuring the catalyst temperature using the temperature sensor;
  determining that an emissions control failure has occurred based at least in part on the catalyst temperature; and
  stopping the flow of smoke in response to determining that the emissions control failure has occurred.

17. The method of claim 16, wherein the emissions control failure occurs when the catalyst temperature drops below a temperature threshold.

18. The method of claim 16, wherein the emissions control failure occurs when a rate of change of the catalyst temperature drops faster than a threshold rate.

19. The method of claim 16, further comprising:
  a smoke generator for generating the flow of smoke, wherein stopping the flow of smoke comprises disabling the smoke generator.

20. The method of claim 16, further comprising:
  notifying a user that the emissions control failure has occurred.

* * * * *